United States Patent
Kim et al.

(10) Patent No.: US 9,617,664 B2
(45) Date of Patent: Apr. 11, 2017

(54) POLYESTER FIBER FOR AIRBAG AND PREPARATION METHOD THEREOF

(75) Inventors: Young-Jo Kim, Gimpo-si (KR);
Ki-Jeong Kim, Youngcheon (KR);
Sang-Mok Lee, Gumi-si (KR);
Young-Soo Lee, Gumi-si (KR)

(73) Assignee: KOLON INDUSTRIES, INC., Kwacheon-si (KR)

( * ) Notice: Subject to any disclaimer, the term of this patent is extended or adjusted under 35 U.S.C. 154(b) by 0 days.

(21) Appl. No.: 13/516,500

(22) PCT Filed: Dec. 17, 2010

(86) PCT No.: PCT/KR2010/009088
§ 371 (c)(1),
(2), (4) Date: Jun. 15, 2012

(87) PCT Pub. No.: WO2011/074920
PCT Pub. Date: Jun. 23, 2011

(65) Prior Publication Data
US 2012/0289114 A1    Nov. 15, 2012

(30) Foreign Application Priority Data
Dec. 18, 2009 (KR) .................. 10-2009-0127203

(51) Int. Cl.
*D03D 1/02* (2006.01)
*D01F 6/62* (2006.01)
(Continued)

(52) U.S. Cl.
CPC .............. *D03D 1/02* (2013.01); *D01D 10/02* (2013.01); *D01F 6/62* (2013.01);
(Continued)

(58) Field of Classification Search
USPC ........................................................ 442/182
See application file for complete search history.

(56) References Cited

U.S. PATENT DOCUMENTS

| | | | | |
|---|---|---|---|---|
| 4,491,657 A | * | 1/1985 | Saito et al. ................ | 528/308.1 |
| 6,672,617 B1 | * | 1/2004 | Gilpatrick et al. ........ | 280/743.1 |

(Continued)

FOREIGN PATENT DOCUMENTS

| | | |
|---|---|---|
| EP | 0 666 344 A1 | 8/1995 |
| EP | 1 845 177 A2 | 10/2007 |

(Continued)

OTHER PUBLICATIONS

JP 07-090746 translation by Takuji.*
Japan Patent Office, Communication dated Feb. 4, 2014, issued in corresponding Japanese application No. 2012-544398.

*Primary Examiner* — Chinessa Adkins
(74) *Attorney, Agent, or Firm* — Sughrue Mion, PLLC

(57) ABSTRACT

The present invention relates to a polyester fiber that can be applied to a fabric for airbag, particularly, to a polyester fiber having an elongation of 0.4% or less at the stress of 1.0 g/d, an enlongation of 4.0% or less at the stress of 4.0 g/d, and an enlongation of 7.0% or less at the stress of 7.0 g/d, and an initial modulus of 105 to 130 g/d; a method of preparing the same; and a fabric for airbag prepared therefrom. Since the polyester fiber of the present invention decreases stiffness remarkably and secures superior mechanical properties by having a high strength, high elongation, and high shrinkage, it is possible to provide superior packing property, dimensional stability, and air-tight effect, and to protect passengers safely by minimizing the impact applied to the passengers, when it is used for the fabric for airbag.

21 Claims, 2 Drawing Sheets

(51) Int. Cl.
   *D01D 10/02*     (2006.01)
   *B60R 21/235*     (2006.01)
(52) U.S. Cl.
   CPC . *B60R 2021/23504* (2013.01); *Y10T 428/298* (2015.01); *Y10T 442/3008* (2015.04)

(56) References Cited

U.S. PATENT DOCUMENTS

| | | | |
|---|---|---|---|
| 7,014,914 B2* | 3/2006 | Keshavaraj | ............... 428/364 |
| 2001/0001689 A1 | 5/2001 | Tang et al. | |
| 2003/0059612 A1 | 3/2003 | Cho et al. | |
| 2005/0153609 A1 | 7/2005 | Keshavaraj | |
| 2007/0243378 A1* | 10/2007 | Cho | ............... D01D 5/16 428/375 |
| 2008/0188151 A1* | 8/2008 | Yokoi | ............... D03D 1/0005 442/76 |
| 2008/0260979 A1* | 10/2008 | Yokoyama et al. | ......... 428/35.7 |
| 2009/0186543 A1* | 7/2009 | Keshavaraj et al. | ......... 442/146 |

FOREIGN PATENT DOCUMENTS

| | | | | |
|---|---|---|---|---|
| JP | 57-154411 | A | | 9/1982 |
| JP | 4-342602 | A | | 11/1992 |
| JP | 63-06728 | A | | 11/1994 |
| JP | 406306730 | A | * | 11/1994 |
| JP | 7-47817 | A | | 2/1995 |
| JP | 7-54238 | A | | 2/1995 |
| JP | 07-090746 | A | | 4/1995 |
| JP | 8-035116 | A | | 2/1996 |
| JP | 08-134717 | A | | 5/1996 |
| JP | 9-143816 | A | | 3/1997 |
| JP | 2864582 | B2 | | 12/1998 |
| JP | 200746193 | A | | 2/2007 |
| KR | WO 2009061161 | A1 | * | 5/2009 ............... D01F 6/62 |

* cited by examiner

POLYESTER FIBER FOR AIRBAG AND PREPARATION METHOD THEREOF

CROSS REFERENCE TO RELATED APPLICATIONS

This application is a National Stage of International Application No. PCT/KR2010/009088 filed on Dec. 17, 2010, which claims priority from Korean Patent Application No. 10-2009-0127203, filed on Dec. 18, 2009, the contents of all of which are incorporated herein by reference in their entirety.

BACKGROUND OF THE INVENTION (a) Field of the Invention

The present invention relates to a polyester fiber that can be applied to a fabric for airbag, and particularly to a high strength, high elongation, and high shrinkage polyester fiber having superior mechanical property, dimensional stability, packing property, and the like, a method of preparing the same, and a fabric for airbag using the same.

(b) Description of the Related Art

Generally, airbag is an apparatus for protecting a driver and passengers by providing a gas into the airbag by exploding gunpowder so as to inflate the airbag after detecting crash impact with an impact detecting sensor, when a driving car collides head-on at the speed of about 40 km/h or more, and a structure of a conventional airbag system is depicted in FIG. 1.

As depicted in FIG. 1, conventional airbag system includes an inflator 121 that generates a gas by ignition of a detonator 122; an airbag module 100 installed in a steering wheel 101 and including an airbag 124 that is expanded and unfolded toward a driver on driver's seat by the generated gas; an impact sensor 130 that gives an impact signal when the car is crashed; and an Electronic Control Module (ECM) 110 that ignites the detonator 122 of the inflator 121 according to the impact signal. In the airbag system, the impact sensor 130 detects the impact and gives the signal to the ECM, when the car collides head-on. At this time, the ECM 110 that received the signal ignites the detonator 122 and a gas generator in the inflator 121 is combusted. The combusted gas generator generates the gas rapidly and expands the airbag 124. The expanded airbag 124 contacts to the front upper body of the driver and absorbs the impact load caused by the collision partially, and when the driver's head and chest go forward according to the law of inertia and smash against the airbag 124, it further absorbs the shock toward the driver by rapidly discharging the gas from the airbag through discharging holes formed on the airbag. Therefore, the airbag absorbs the shock effectively that is delivered to the driver, and can reduce the secondary injury at the time of a head-on collision.

As disclosed above, the airbag for a car is prepared into a certain shape and installed in a steering wheel, side glass windows, or side pillars of the car in a folded form so as to minimize the volume, and it is expanded and unfolded when the inflator 121 operates.

Therefore, it is very important that the airbag has the folding property and the flexibility for reducing the shock to the passenger in addition to good mechanical property of the fabric for maintaining the folding and packaging properties of the airbag effectively when it is installed in a car, preventing the damage and rupture in the airbag itself, providing good unfolding property of the airbag cushion, and minimizing the impact provided to the passenger. However, the airbag fabric that can maintain superior air-tightness and flexibility for the passenger's safety, endure the impact applied to the airbag sufficiently, and be effectively installed in a car has not been suggested yet.

Previously, polyamide fiber such as nylon 66 has been used as the raw material of the fiber for airbag. However, nylon 66 has superior impact resistance but is inferior to polyester fiber in humid heat resistance, light resistance, and shape stability, and expensive.

Meanwhile, Japanese patent publication No. Hei 04-214437 suggested the polyester fiber for reducing such defects. Particularly, when the airbag was prepared by using prior polyester fiber, the fineness of the fiber was low in order to be installed in a narrow space in a car. However, the polyester fiber having low fineness leads to the drops of strength and toughness, and there was a limitation for maintaining sufficient mechanical property, air-tightness, and unfolding property at the severe conditions of high temperature and high humidity.

Therefore, it is needed to develop the fiber that maintains superior shape stability and air-tight effect so as to be used for an airbag fabric, and also maintains flexibility for reducing the impact applied to passengers, the packing property, and superior mechanical properties at the severe conditions of high temperature and high humidity.

SUMMARY OF THE INVENTION

It is an aspect of the present invention to provide a polyester fiber for airbag that secures superior shape stability, flexibility, and packing property in order to be used to an airbag fabric, and maintains sufficient performance at the severe conditions of high temperature and high humidity.

It is another aspect of the present invention to provide a method of preparing the polyester fiber.

It is still another aspect of the present invention to provide a fabric for airbag prepared by using the polyester fiber.

The present invention provides a polyester fiber for airbag, having an elongation of 0.4% or less at the stress of 1.0 g/d, an enlongation of 4.0% or less at the stress of 4.0 g/d, and an enlongation of 7.0% or less at the stress of 7.0 g/d, and an initial modulus of 105 to 130 g/d, at room temperature.

The present invention also provides a method of preparing the polyester fiber, including the steps of: melt-spinning a polyester polymer having an intrinsic viscosity of 0.85 dl/g or more at 270 to 305° C. to prepare a polyester undrawn fiber; and drawing the polyester undrawn fiber.

The present invention further provides a fabric for airbag prepared by using the polyester fiber.

DETAILED DESCRIPTION OF THE EMBODIMENTS

Figure 1:
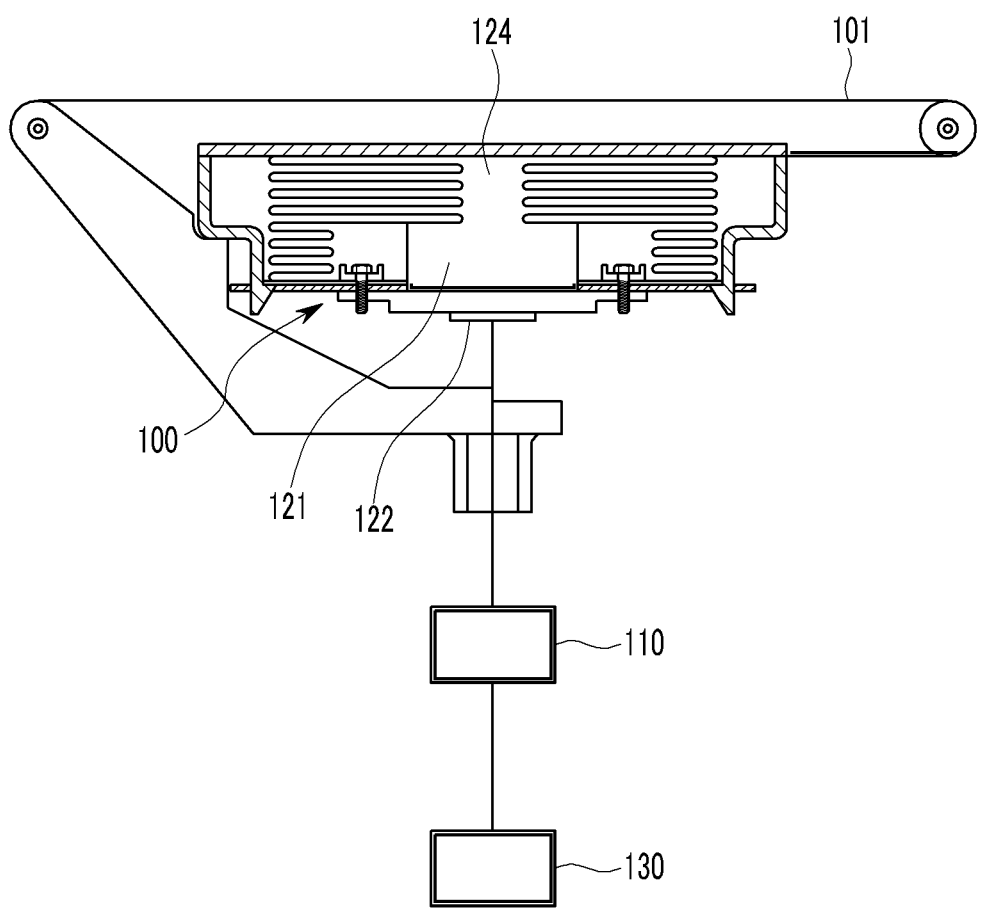
FIG. 1 is a drawing showing a conventional airbag system.

Hereinafter, the polyester fiber for airbag according to embodiments of the present invention, the method of preparing the same, and the fabric for airbag prepared by using the same are explained in more detail. However, the followings are only for the understanding of the present invention and the scope of the present invention is not limited to or by them, and it is obvious to a person skilled in the related art that the embodiments can be variously modified in the scope of the present invention.

In addition, "include" or "comprise" means to include any components (or ingredients) without particular limitation unless there is no particular mention about them in this description, and it cannot be interpreted as a meaning of excluding an addition of other components (or ingredients).

After preparing a drawn fiber (namely, the fiber for airbag) by melt-spinning the polymer including poly(ethylene terephthalate) (PET) so as to prepare an undrawn fiber and drawing the same, the polyester fabric for airbag may be prepared by weaving from the obtained polyester fibers. Therefore, the characteristics of the polyester fiber are directly/indirectly reflected in the polyester fabric for airbag.

Particularly, in order to apply the polyester to the fiber for airbag instead of prior polyamide such as nylon 66, the disadvantages of prior polyester fibers such as a low folding property according to its high modulus and stiffness, a falling-off in property at the severe conditions of high temperature and high humidity according to its low melt heat capacity, and a decline in unfolding performance according the same must can be overcome, simultaneous with increasing an air-tightness of the fiber to improving a problem that the air of the airbag leaks easily.

Polyester has lower shrinkage and more stiff structure in terms of molecular structure than them of nylons. Therefore, it is difficult to provide the airbag fabric having superior air-tightness by performing through a heat treating process, and the packing property deteriorates remarkably when it is used to the fabric for airbag and installed in a car. Furthermore, the carboxyl end groups (hereinafter "CEG") in the polyester molecular chain attack ester bonds at the condition of high temperature and high humidity and cut the chain, and it becomes a cause of deterioration of the properties after aging.

Accordingly, the polyester fiber of the present invention can be effectively applied to the fabric for airbag, because the mechanical properties such as toughness and air-tight performance of the fabric can be maintained while the stiffness is remarkably lowered by optimizing the range of the properties of the polyester fiber, for example, the initial modulus, the elongation, and the like.

Particularly, it is revealed from the results of the present inventor's experiments that a fabric for airbag shows more improved folding property, shape stability, and air-tight effect, by preparing the fabric for airbag from the polyester fiber having above characteristics. The fabic for airbag can maintain superior packing property, superior mechanical property, air-leakage protection, insulating property, and air-tightness, and the like, even under the severe conditions of high temperature and high humidity.

According to one embodiment of the present invention, a polyester fiber having specific characteristics is provided. The polyester fiber may show an elongation of 0.4% or less at the stress of 1.0 g/d, an enlongation of 4.0% or less at the stress of 4.0 g/d, and an enlongation of 7.0% or less at the stress of 7.0 g/d, and an initial modulus of 105 to 130 g/d, at room temperature.

It is preferable that the polyester fiber includes PET as a main component. At this time various additives may be included in the PET during the preparing steps thereof, and thus the fiber may include the PET in the content of 70 mol % or more, and preferably of 90 mol % or more, in order to show the properties suitable for the fabric for airbag. Hereinafter, the term named by PET means the polymer including PET in the content of 70 mol % or more unless any special explanation.

The polyester fiber according to one embodiment of the present invention may be prepared under the melt-spinning and drawing conditions those will be mentioned later, and the fiber shows the initial modulus of 105 to 130 g/d and the elongation of the same is 0.4% or less when it receives the stress of 1.0 g/d, 4.0% or less when it receives the stress of 4.0 g/d, and 7.0% or less when it receives the stress of 7.0 g/d, at room temperature.

The polyester generally has lower shrinkage than nylons, and then it is difficult to maintain superior air-tightness when the airbag fabric is prepared through a heat treating process. Also, the polyester has higher stiffness than nylons due to its molecular structure, and shows a characteristic of high modulus, and it becomes difficult to install the airbag in a narrow space of a car when it is used to the fabric for airbag because the folding property and the packing property of the same deteriorate remarkably. However, the polyester fiber obtained through the controlled melt-spinning and drawing process by using a polyester polymer having a high intrinsic viscosity shows the characteristics of high strength, high elongation, and high shrinkage, and shows low initial modulus of 105 to 130 g/d, preferably initial modulus of 107 to 128 g/d, and more preferably of 110 to 125 g/d, which is lower than known industrial polyester fibers.

The modulus of the polyester fiber means a modulus value of elasticity that is obtained from a gradient in an elastic range of a tenacity-elongation graph obtained by a tensile test, and corresponds to a coefficient value of elasticity indicating a degree of elongation and a degree of deformation when the fiber is stretched by its both side ends. Furthermore, the initial modulus of the fiber means a modulus value of elasticity at an approximate starting point of the elastic range after "0" point in the tenacity-elongation graph. When the initial modulus of the fiber is high, the elasticity is good but the stiffness of the fabric may be bad. On the other hand, when the initial modulus is too low, the stiffness of the fabric is good but the elastic recovery becomes low and the toughness of the fabric may be bad. By the way, the initial modulus value of the polyester fiber of the present invention is optimized in the range as described above, which shows the properties of a high strength, high elongation, and high shrinkage. As such, since the fabric for airbag is prepared from the polyester fiber having the optimized initial modulus, the fabric can show superior folding property, flexibility, and packing property, simultaneous with the improved air-tightness, than those of the prior polyester fabric.

In addition to the optimized initial modulus, the polyester fiber also has the characteristics of minimized drawing. The elongation of the polyester fiber may be 0.4% or less, for example, 0.05% to 4.0%, and preferably 0.1% to 0.4% at the stress of 1.0 g/d; 4.0% or less, for example, 0.05% to 4.0%, and preferably 0.1% to 4.0% at the stress of 4.0 g/d; and 7.0% or less, for example, 1.0% to 7.0%, and preferably 2.0% to 7.0% at the stress of 7.0 g/d, at room temperature. Accordingly, the fabric for airbag prepared from the polyester fiber having the characteristics can resolve the problem caused from the low air-tightness and high stiffness of the prior polyester fabric, and can show superior folding property, flexibility, and packing property.

At the same time, the polyester fiber may show more improved intrinsic viscosity than those of the prior known polyester fibers. Namely, the intrinsic viscosity of the polyester fiber according to the present invention may be 0.8 dl/g or more, for example 0.8 dl/g to 1.2 dl/g, preferably 0.85 dl/g or more, for example, 0.85 dl/g to 1.15 dl/g, and more preferably 0.98 dl/g or more, for example, 0.9 dl/g to 1.10 dl/g. It is preferable that the intrinsic viscosity is maintained in above range, in order to prevent heat deformation in a coating process, when the polyester fiber is applied to the airbag.

It is preferable that the intrinsic viscosity of the fiber is 0.8 dl/g or more so as to exhibit high strength with low drawing ratio and satisfy the tenacity required to the fiber for airbag. Otherwise, the polyester fiber should be proceeded with high drawing ratio to obtain the properties required to the fiber for airbag. In the case of applying high drawing ratio to the fiber, the degree of orientation of the fiber may be increased that the fiber may have low elongation and low shrinkage. Therefore, it is preferable to apply low drawing ratio in the drawing process so as to enable to exhibit the properties of high strength, high elongation, and high shrinkage by maintaining the intrinsic viscosity to be 0.8 dl/g or more. Furthermore, because the drawing tension increases during the drawing process and some problems arise on the drawing process when the intrinsic viscosity of the fiber is more than 1.2 dl/g, the intrinsic viscosity is preferably 1.2 dl/g or less. Particularly, the polyester fiber of the present invention can have low stiffness with low drawing ratio by maintaining such high intrinsic viscosity. The polyester fiber of the present invention also have high strength characteristic that can provide the fabric for airbag with sufficient mechanical property, impact resistance, toughness, and the like.

Therefore, it is possible to prepare the fabric for airbag showing superior mechanical property, packing property, shape stability, impact resistance, and air-tight effect at the same time by using the polyester fiber having such optimized initial modulus and high elongation and preferably high intrinsic viscosity. Therefore, the fabric for airbag showing superior impact resistance, shape stability, mechanical property, and air-tightness in addition to lower stiffness, and superior folding property, flexibility, and packing property can be obtained by using the polyester fiber. Such fabric can be applied preferably to an airbag, because the fabric provides good folding property and packing property when it is installed in a narrow space in a car, while showing superior mechanical property, shape stability, and air-tight effect. Also, the fabric for airbag can protect a passenger safely by minimizing the shock applied to the passenger with its superior flexibility.

Furthermore, the polyester fiber of the present invention may show largely lessened CEG content in comparison with the prior known polyester fibers, because it is prepared under the melt-spinning and drawing conditions those will be mentioned later. Namely, the CEG content of the polyester fiber of the present invention may be 50 meq/kg or less, preferably 40 meq/kg or less, and more preferably 30 meq/kg or less. The CEG in the polyester molecular chain attacks ester bonds at the condition of high temperature and high humidity and cuts the chain, and it deteriorates the properties of the fiber after aging. Particularly, when the fiber having more than 50 meq/kg of the CEG content thereof is applied to an airbag, the CEGs attack and cut the ester bonds of the fiber at the condition of high humidity and the properties deteriorate. Therefore, it is preferable that the CEG content of the polyester fiber is 50 meq/kg or less.

Meanwhile, the polyester fiber according to one embodiment of the present invention may show the tensile tenacity of 7.5 g/d or more, for example, 7.5 g/d to 11.0 g/d, and preferably of 8.0 g/d or more, for example, 8.0 g/d to 10.0 g/d, and the elongation at break of 13% or more, for example, 13% to 35%, and preferably of 14% or more, for example, 14% to 25%. Furthermore, the dry heat shrinkage of the fiber may be 5.0% or more, for example, 5.0% to 10.0%, and preferably of 5.2% or more, for example, 5.2% to 10.0%, and the toughness of the fiber may be $25\times10^{-1}$ g/d or more, for example, $25\times10^{-1}$ g/d to $46\times10^{-1}$ g/d, and preferably of $31\times10^{-1}$ g/d or more, for example, $31\times10^{-1}$ g/d to $44\times10^{-1}$ g/d. As disclosed above, when the polyester fiber of the present invention is applied to the fabric for airbag, the fiber exhibits superior performance as well as superior tenacity and properties by securing the intrinsic viscosity, the initial modulus, and the elongation in their optimal ranges. Particularly, it is possible to control the air permeability of the fabric for airbag effectively, by maintaining the shrinkage of the polyester fiber in the optimized rang as above.

Furthermore, the shrinkage stress of the polyester fiber of the present invention is preferably 0.005 to 0.075 g/d at the temperature of 150° C. corresponding to the laminate coating temperature of common coated fabrics, and also preferably 0.005 to 0.075 g/d at the temperature of 200° C. corresponding to the sol coating temperature of common coated fabrics. Namely, it is possible to prevent the fabric from sagging due to the heat during the coating process when the shrinkage stresses at 150° C. and 200° C. are respectively 0.005 g/d or more. It is also possible to decrease the relaxing stress during cooling process at room temperature after the coating process when the shrinkage stresses at the temperature of 150° C. and 200° C. are respectively 0.075 g/d or less. The shrinkage stress is based on the value measured under the fixed load of 0.10 g/d.

The polyester fiber may have a crystallinity of 40% to 55%, preferably of 41% to 52%, and more preferably of 41% to 50% in order to prevent the deformation during a heat-treating process such as said coating process. When the fiber is applied to an airbag, it is preferable for maintaining the thermal shape stability that the crystallinity is 40% or more. It is also preferable that the crystallinity is 55% or less because the impact absorbing performance may decrease as the amorphous area decrease when the crystallinity is more than 55%.

Furthermore, the fineness of monofilament of the polyester fiber may be 0.5 to 20 denier, and preferably 2.0 to 10.5 denier. The polyester fiber must maintain high strength and low fineness in the aspect of packing property so that the fiber is used effectively to the fabric for airbag. Accordingly, the total fineness of the fiber may be 200 to 1,000 denier, preferably 220 to 840 denier, and more preferably 250 to 600 denier. Furthermore, it is preferable that the number of filaments of the fiber may be 50 to 240, preferably 55 to 220, and more preferably 60 to 200, because more number of the filaments of the fiber can give softer feel but too much number of the filaments is not good in spinnability.

Meanwhile, the polyester fiber according to one embodiment of the present invention disclosed above can be prepared by melt-spinning the polyester polymer, for example PET chips, so as to prepare the undrawn fiber, and drawing the undrawn fiber. It is possible to produce the polyester fiber having above properties because the concrete conditions and processing methods of above each step are directly/indirectly reflected in the properties of the polyester fiber, as disclosed above.

Particularly, it is revealed that it is possible to secure the polyester fiber for airbag, through the optimization of the processes, which has an initial modulus of 105 to 130 g/d and an elongation of 0.4% or less at the stress of 1.0 g/d, an elongation of 4.0% or less at the stress of 4.0 g/d, and an elongation of 7.0% or less at the stress of 7.0 g/d, at room temperature. It is also revealed that it is possible to minimize the content of the CEG, through the optimization of the melt-spinning and drawing processes, which exists as an acid under high humidity condition to cause the scission of basic molecular chains of the polyester fiber. Therefore, such polyester fiber shows the optimized initial modulus and elongation at the same time, and may be preferably applied to the fabric for airbag having superior mechanical property, packing property, shape stability, impact resistance, and air-tight effect.

Hereinafter, the method of preparing the polyester fiber is explained step by step in more detail.

The method of preparing the polyester fiber includes the steps of: melt-spinning a polyester polymer having an intrinsic viscosity of 0.85 dl/g or more at 270 to 305° C. to prepare a polyester undrawn fiber; and drawing the polyester undrawn fiber.

Firstly, the aspects of the melt-spinning and drawing processes of the present invention are briefly explained by referring annexed figures so that it may easily be carried out by a person with ordinary skill in the related art.

Figure 2:
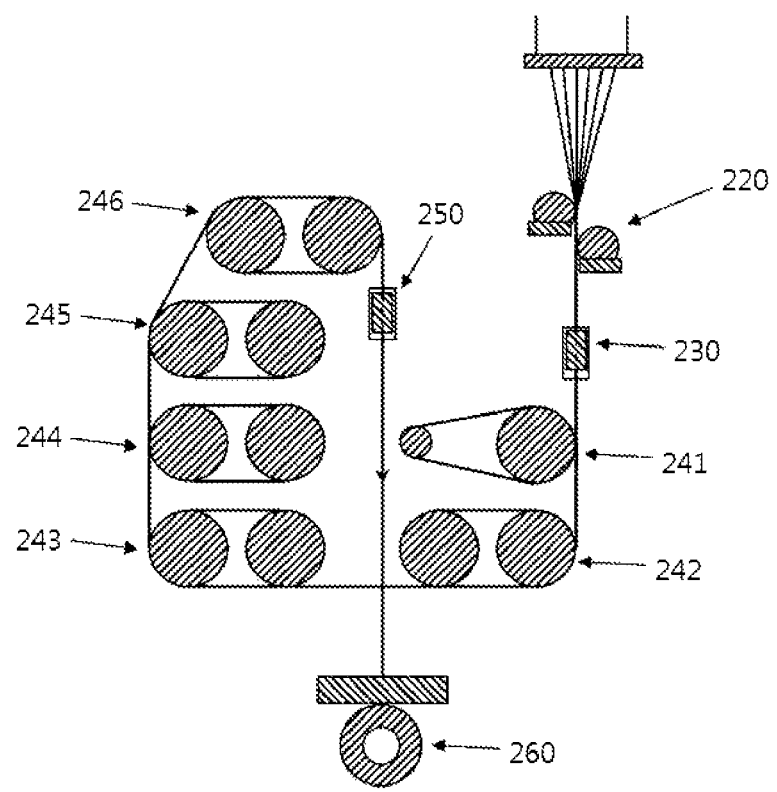
FIG. 2 is a schematic flow diagram showing a process of preparing a polyester fiber for airbag according to one embodiment of the present invention.

FIG. 2 is a schematic drawing showing a process of preparing a polyester fiber including the melt-spinning and drawing steps according to one embodiment of the present invention. As shown in FIG. 2, the method of preparing the polyester fiber for airbag of the present invention includes the steps of melting the polyester polymer disclosed above, spinning the molten polymer through a spinning die, cooling the spun fiber with quenching-air, providing the undrawn fiber with a spinning oil by using an oil-roll (or oil-jet) 220, and dispersing the oil that is provided to the undrawn fiber uniformly on the surface of the fiber with uniform air pressure by using a pre-interlacer 230. After this, the present fiber may be prepared by drawing the undrawn fiber through multi-step drawing devices 241-246, intermingling the fiber at a second interlacer 150 with uniform pressure, and winding the fiber with a winder 260.

Meanwhile, the method of the present invention may use a polyester polymer having high viscosity to prepare the undrawn fiber through a melt-spinning process.

The melt-spinning process may be carried out at a low temperature range to minimize the thermal degradation of the polyester polymer, which is preferable to obtain the polyester undrawn fiber satisfying the low initial modulus and high elongation range. Particularly, the spinning process may be carried out at a low temperature range, for example 270 to 305° C., preferably 275 to 300° C., and more preferably 280 to 300° C. It is preferable to minimize the deterioration of the property such as the intrinsic viscosity and the CEG content of the polyester polymer having high viscosity according to the process, namely to maintain the high viscosity and low CEG content of the polyester polymer. Here, the spinning temperature means the temperature of the extruder. When the melt-spinning process is carried out at the temperature of more than 305° C., a plenty of thermal degradation of the polyester polymer may be caused and a decrease in the intrinsic viscosity, a decrease in the molecular weight, and an increase in the CEG content may be enlarged. Namely, the deterioration of overall properties may be caused by the damages in the surface of the fiber, and thus it is undesirable. Furthermore, it is undesirable that the melt-spinning process is carried out at the temperature below 270° C., because the melting of the polyester polymer may be difficult and the spinnability may be decreased due to the N/Z surface cooling. Therefore, it is preferable that the melt-spinning process is carried out in said temperature range.

As the results of experiments, it is revealed that the high strength fiber can be obtained without applying high drawing ratio in the drawing process by carrying out the melt-spinning process of the polyester fiber at such low temperature range. Particularly, the melt-spinning process at such low temperature range is prefreable to minimize the degradation reaction of the polyester polymer, maintain the high intrinsic viscosity of the polyester polymer, and secure the high molecular weight of the polyesterfibe. Furthermore, the polyester fiber satisfying the properties disclosed above can be obtained because it is possible to reduce the modulus effectively by carrying out the drawing process with the low drawing ratio.

Furthermore, the speed of the melt-spinning process of the polyester polymer may be controlled to be a low speed, for example 300 to 1,000 m/min, and preferably 350 to 700 m/min. It is preferable to carry out the process under lower spinning tension, namely, to minimize the spinning tension, by minimizing the degradation reaction of the polyester polymer. The degradation reaction of the polyester polymer can be minimized by carrying out the melt-spinning process of the polyester polymer with the low spinning tension and the low spinning speed selectively.

Meanwhile, the undrawn fiber obtained through the melt-spinning process may show the intrinsic viscosity of 0.8 dl/g or more, for example 0.8 dl/g to 1.2 dl/g, preferably of 0.85 dl/g or more, for example 0.85 dl/g to 1.15 dl/g, and more preferably of 0.90 dl/g or more, for example 0.90 dl/g to 1.10 dl/g. The content of the CEG in the molecules of the undrawn fiber obtained by the low temperature spinning may be 50 meq/kg or less, preferably 40 meq/kg or less, and more preferably 30 meq/kg or less. Such CEG content in the molecules of the undrawn fiber may be maintained with same level even in the drawn fiber, namely the polyester fiber, which is drawn in the succeeding drawing process.

As disclosed above, it is preferable to effectively lower the modulus of the polyester fiber by using the polyester polymer having more high viscosity, for example 0.85 dl/g or more, in the process of preparing the undrawn fiber. Namely, it is preferable for preparing the polyester fiber having high strength and low modulus in maximum, by maintaining the high viscosity range in maximum and applying a low drawing ratio during the melt-spinning and drawing processes. Also, it is preferably that the intrinsic viscosity is 2.0 dl/g or less in order to prevent the scission of the molecular chain due to the increased melting temperature of the polyester polymer, and the pressure increase due to the discharge rate in the spinning pack.

Furthermore, the CEG content in a molecule of the polyester polymer may be preferably 30 meq/kg or less to maintain superior properties of the polyester fiber and the fabric for airbag, which is prepared from the polyester polymer, even at the high temperature and high humidity conditions. Particularly, it is preferable that the CEG content of the polyester polymer is maintained to the lowest range even after the melt-spinning and drawing processes. Thus, the polyester fiber prepared finally from the polymer can secure high strength, superior shape stability, and superior mechanical property, as well as exhibit the superior properties even at the severe conditions. In this aspect, if the CEG content is more than 30 meq/kg, the CEG content in molecules of the final polyester fiber prepared through the melt-spinning and drawing processes may increase with an excess, for example, to the range of more than 50 meq/kg.

In this case, the properties of the fiber itself and the fabric prepared therefrom may be deteriorated because the ester bonds are cut by the CEG at the high humidity condition.

Particularly, the polyester polymer having high intrinsic viscosity and low CEG content can minimize the difference in the intrinsic viscosity and the CEG content between the polyester polymer and the polyester fiber, by carrying out the melt-spinning process at the low temperature and suppressing the thermal degradation in maximum as described above. For example, the melt-spinning and the succeeding processes may be carried out so that the difference between the intrinsic viscosity of the polyester polymer and the intrinsic viscosity of the polyester fiber becomes 0.5 dl/g or less, or 0 to 0.5 dl/g, and preferably 0.4 dl/g or less, or 0.1 to 0.4 dl/g. Furthermore, the processes may be carried out so that the difference between the CEG content of the polyester polymer and the CEG content of the polyester fiber is 20 meq/kg or less, or 0 to 20 meq/kg, and preferably 15 meq/kg or less, or 3 to 15 meq/kg.

The polyester polymer preferably includes poly(ethylene terephthalate), i.e., PET, as its main component. It may include 70 mol % or more of the PET, and preferably 90 mol % or more, in order to secure the mechanical property as the fiber for airbag.

The present invention can maintain the superior mechanical property of the polyester fiber and secure the good elongation of the polyester fiber at the same time, by suppressing the intrinsic viscosity decrease and the e CEG content increase of the polyester polymer in maximum, and can prepare the high strength and low modulus fiber that is suitable for the fabric for airbag.

The polyester polymer, for example the PET chip, may be preferably spun through the die to make the fineness of the monofilament in the range of 0.5 to 20 denier, and preferably 1 to 15 denier. Namely, it is preferable that the fineness of the monofilament is 1.5 denier or more in order to lower the fiber scission during the spinning process and the possibility of the fiber scission due to the interference between the fibers during the cooling process. It is also preferable that the fineness of the monofilament is 15 denier or less in order to increase the cooling efficiency.

The polyester undrawn fiber may be prepared by further adding a cooling process after melt-spinning the polyester polymer. The cooling process is preferably carried out by applying a cooling air of 15 to 60° C. It is also preferable to control the flow rate of the cooling air to be 0.4 to 1.5 m/s according the temperature of the cooling air. Thus, the polyester undrawn fiber showing all the properties of the present embodiment can be easily prepared.

Meanwhile, after preparing the polyester undrawn fiber through above spinning step, the drawn fiber is prepared by drawing the undrawn fiber. The drawing process can be carried out with the total drawing ratio of 5.0 to 6.5, and preferably 5.0 to 6.2. Particularly, the drawing process may be performed with the drawing ratio of 3.0 to 5.0, and preferably 3.2 to 4.8 between GR2 and GR3, after passing the polyester undrawn fiber through GR1 and GR2, and with the drawing ratio of 1.0 to 2.0, and preferably 1.2 to 1.8 between GR3 and GR4.

Through the optimized melt-spinning process, the polyester undrawn fiber maintains its high intrinsic viscosity and low initial modulus, and the CEG content in the molecules of the polyester undrawn fiber is also minimized. Therefore, when the drawing process is carried out with the drawing ratio of more than 6.5, it may be an excess drawing level to generate the scission or hairiness of the fiber, and the polyester fiber having low elongation may be obtained due to the high degree of orientation of the fiber. Particularly, if the elongation of the fiber decreases by such high drawing ratio condition, the folding property and the packing property may be not good when the fiber is applied to the fabric for airbag. On the other hand, if the drawing process is carried out with relatively low drawing ratio, the tenacity of the prepared polyester fiber may be partially decreased because the degree of orientation of the fiber is low. However, in the aspect of securing the superior property, if the drawing process is carried out at the drawing ratio of 5.0 or more, the polyester fiber having high strength, high elongation, and high shrinkage suitable for the fabric for airbag can be prepared. Therefore, it is preferable that the drawing process is carried out with the drawing ratio of 5.0 to 6.5.

According to another proper embodiment of the present invention, the method of preparing the polyester fiber may include the processes of drawing, heat-setting, relaxing, and winding through multi-step godet rollers from the melt-spinning process of the high viscosity polyester polymer chip to the winding process by the winder, in order to prepare the polyester fiber having high shrinkage for satisfying the properties of high tenacity and elongation at the same time by a direct spinning and drawing process.

The drawing process can be carried out after passing the undrawn fiber through the godet rollers with oil pick-up unit of 0.2% to 2.0%.

The relaxing ratio in the relaxing process may be preferably 1% to 7%, preferably 1.1% to 6.8%. When the relaxing ratio is below 1.0%, the fiber may be under a high tension to cause the scission of the fiber. On the other hand, when the ratio is more than 7%, it may be difficult to exhibit high shrinkage and it is also difficult to secure superior air-tightness of the fabric for airbag.

Furthermore, the drawing process may further include the heat-setting process that heat-treats the undrawn fiber at the temperature of about 170 to 225° C. It is possible to heat-treat the fiber at the temperature of preferably 175 to 220° C. for the adequate progress of the drawing process. When the temperature of the heat-setting process is below 170° C., it may be difficult to obtain the shrinkage because the thermal effect is not sufficient and the relaxing efficiency falls. On the other hand, when the temperature is more than 225° C., the shrinkage of the fiber may be deteriorated by increasing increase of the relaxing ratio and it is also difficult to secure superior air-tightness of the fabric for airbag.

At this time, the winding speed may be 2,000 to 4,000 m/min, and preferably 2,500 to 3,700 m/min.

According to still another embodiment of the present invention, the fabric for airbag including the polyester fiber disclosed above is provided.

In the present invention, the fabric for airbag means a woven fabric or a nonwoven fabric for preparing the airbag for a car. The fabric for airbag of the present invention is characterized by being prepared from the polyester fiber which is prepared through above processes.

Particularly, the present invention can provide the polyester fabric for airbag that has superior shape stability and air-tightness, and superior folding property, flexibility, and packing property, as well as superior energy absorbing ability during the airbag expands, by using the polyester fiber having high tenacity-high elongation instead of the prior polyester fiber having high tenacity-low elongation. Furthermore, the fabric for airbag not only is superior in the properties at room temperature but also maintains the superior mechanical property and air-tightness even after aging at the severe conditions of high temperature and high humidity.

More particularly, the tensile tenacity of the fabric for airbag of the present invention that is measured at room temperature according to ASTM D 5034 method may be 220 kgf/inch or more, for example, 220 to 350 kgf/inch, and preferably 230 kgf/inch or more, for example, 230 to 300 kgf/inch. It is preferable that the tensile tenacity is 220 kgf/inch or more in the aspect of the properties required to prior airbags. It is also preferable that the tensile tenacity is 350 kgf/inch or less in the aspect of practical property exhibition.

The elongation at break of the fabric for airbag that is measured according to ASTM D 5034 method at room temperature may be 20% or more, for example, 20% to 60%, and preferably 28% or more, for example, 28% to 50%. It is preferable that the elongation at break is 20% or more in the aspect of the properties required to prior airbags. It is also preferable that the elongation at break is 60% or less in the aspect of practical property exhibition.

Furthermore, because the fabric expands rapidly by the gas of high temperature and high pressure, superior tearing strength is required to the coated fabric for airbag. Therefore, the tearing strength that represents the burst strength of the coated fabric for airbag may be 22 kgf or more, for example, 22 to 60 kgf, and preferably 25 kgf or more, for example, 25 to 55 kgf when it is measured according to ASTM D 2261 method at room temperature. If the tearing strength of the coated fabric is below the lowest limit, namely below 23 kgf, at room temperature, the airbag may burst during the expansion thereof and it may cause a huge danger in function of the airbag.

The shrinkage rates in the directions of warp and weft of the fabric for airbag according to the present invention that are measured according to ASTM D 1776 method may be 4.0% or less, and preferably 2.0% or less, respectively. It is most preferable that the shrinkage rates in the directions of warp and weft do not exceed 1.0%, in the aspect of securing the superior shape stability of the fabric.

The air permeability of the fabric that is measured according to ASTM D 737 method at room temperature may be 10.0 cfm or less, for example, 0 to 10.0 cfm, or 0.5 to 10.0 cfm. Particularly, the air permeability of the fabric for airbag can be apparently lowered by forming a coated layer of a rubber material on the fabric, which is possible to lower the air permeability to near almost 0 cfm. The air permeability of the fabric for airbag according to the present invention may be 1.4 cfm or less, for example, 0 to 1.4 cfm. However, unless the rubber material is coated thereon, the air permeability of the non-coated fabric of the present invention that is measured according to ASTM D 737 method at room temperature may be 10.0 cfm or less, for example, 0 to 10.0 cfm, preferably 3.5 cfm or less, for example, 0 to 3.5 cfm. If the air permeability of the non-coated fabric is over 10.0 cfm, and preferably over 3.5 cfm, or the air permeability of the coated fabric is over 1.4 cfm, it may be undesirable in the aspect of maintaining the air-tightness of the fabric for airbag.

Furthermore, the stiffness of the fabric for airbag according to the present invention that is measured according to ASTM D 4032 method at room temperature may be 0.2 kgf or more, for example, 0.2 to 1.2 kgf, and preferably 0.5 kgf or more, for example, 0.5 to 1.0 kgf. Particularly, the stiffness may be 1.2 kgf or less when the total fineness of the fiber is 530 denier or more, and the stiffness may be 0.8 kgf or less when the total fineness of the fiber is 460 denier or less.

The fabric of the present invention is preferable to maintain said range of the stiffness in order to use it for airbag effectively. If the stiffness is too low as below 0.2 kgf, it may not make a function as a sufficient protecting support when the airbag is expanded, and the packing property also may be deteriorated when it is installed in a car because its shape stability gets bad. Furthermore, the stiffness may be preferably 1.2 kgf or less, in order to prevent that the fabric becomes rigid and hard to be folded and the packing property is deteriorated, and that the fabric is discolored. Particularly, the stiffness of the fabric for airbag may be 0.8 kgf or less in the case of being 460 denier or less of the total fineness, and 1.2 kgf or less in the case of being 530 denier or more of the total fineness.

Furthermore, according to still another embodiment of the present invention, the method of preparing the fabric for airbag by using the polyester fiber is provided. The present method of preparing the fabric for airbag includes the steps of weaving a raw fabric for airbag from the polyester fibers; scouring the woven raw fabric for airbag; and tentering the scoured fabric.

In the present invention, the polyester fiber can be prepared into the final fabric for airbag through a conventional weaving method, and scouring and tentering processes. The weaving type of the fabric is not limited to a particular type, and both weaving types of a plain type and a one piece woven (OPW) type are preferable.

Particularly, the fabric for airbag of the present invention may be prepared through the processes of beaming, weaving, scouring, and tentering by using the polyester fiber as the warps and the wefts. The fabric may be prepared by using a conventional weaving machine, but it is not limited to any particular weaving machine. However, the plain type fabrics may be prepared by using a Rapier Loom, a Water Jet Loom, and the like, and the OPW type fabrics may be prepared by a Jacquard Loom.

Furthermore, it is preferable that the fabric for airbag of the present invention further includes a coating layer that is coated or laminated on the surface with at least one selected from the group consisting of silicone resin, polyvinylchloride resin, polyethylene resin, polyurethane resin, and the like, but the kinds of the coating resin is not limited to the materials mentioned above. The resin coated layer may be formed by a knife over roll coating method, a doctor blade method, or a spray coating method, but it is not limited to the methods mentioned above.

The amount of the coated resin per unit area of the coating layer may be 20 to 200 $g/m^2$, and preferably 20 to 100 $g/m^2$. Particularly, the amount of the coated resin is preferably 30 $g/m^2$ to 95 $g/m^2$ in the case of the OPW type fabric for side curtain airbag, and preferably 20 $g/m^2$ to 50 $g/m^2$ in the case of the plain type fabric for airbag.

The coated fabric for airbag may be prepared into a form of an airbag cushion having a certain shape through the processes of tailoring and sewing. The airbag is not limited to any particular shape, and can be prepared into a general form.

Meanwhile, according to still another embodiment of the present invention, an airbag system including said airbag is provided. The airbag system may be equipped with common device that is well known to the related manufacturers. The airbag may be largely classified into a Frontal Airbag and a Side Curtain Airbag. As the frontal airbag, there are various airbags for driver's seat, for passenger seat, for protecting side, for protecting knees, for protecting ankles, for protecting a pedestrian, and the like, and the side curtain airbag protects the passenger from a broadside collision and a rollover of a car. Therefore, the airbag of the present invention includes both of the frontal airbag and the side curtain airbag.

As explained, according to the present invention, the polyester fiber for airbag that can make the fabric for airbag having superior air-tightness and folding property as well as superior mechanical property is provided by optimizing the initial modulus, the elongation, and the like in a specific range.

Particularly, since the polyester fiber for airbag is optimized to have high strength, high elongation, and high shrinkage, it is possible to obtain superior shape stability, mechanical property, and air-tight effect when it is used for preparing the fabric for airbag. It is also possible to improve the packing property remarkably by securing superior folding property and flexibility, and to protect the passenger safely by minimizing the impact applied to the passenger.

Therefore, the polyester fiber and the polyester fabric of the present invention can be very preferably used for preparing the airbag for a car.

EXAMPLES

Hereinafter, preferable examples and comparative examples are presented for understanding the present invention. However, the following examples are only for illustrating the present invention and the present invention is not limited to or by them.

Examples 1 to 5

According to the processing conditions shown in the following Table 1, the polyester fiber for airbag chips were prepared through the steps of melt-spinning and drawing, by using PET chips having the intrinsic viscosity (IV) and CEG content in the range as shown in Table 1.

The PET chips were melted at the temperature range of 283-295° C. and the molten polyesters were discharged through a spinning die. The discharged molten polyesters were passed through a delayed quenching zone composed of a hood-heater and a heat insulating plate and delayed-quenched.

Spinning oil was applied to the delayed-quenched polyester fibers by using a roll-type oiling apparatus. The amount of the oil was 0.8 parts by weight per 100 parts by weight of the fibers. The spinning oil was a mixture of an ethyleneoxide/propyleneoxide adducted diol ester (30 parts by weight), ethyleneoxide adducted diol ester (15 parts by weight), glyceryl triester (10 parts by weight), trimethylpropane triester (10 parts by weight), and small quantity of an anti-static agent The oiled fibers were passed through a pre-interlacer and drawn by using godet-rollers.

After the drawing, the polyester fibers were prepared by intermingling the drawn fibers by using a second interlacer and winding up the same with a winder.

At this time, the intrinsic viscosity of the PET polymer, the CEG content in the molecules, the spinning speed, the spinning tension, and the spinning temperature of the melt-spinning process, the drawing ratio, the heat-treating temperature, a relaxing ratio, and the like were as disclosed in the following Table 1, and the other conditions followed conventional conditions for preparing a polyester fiber.

TABLE 1

|  | Example 1 | Example 2 | Example 3 | Example 4 | Example 5 |
|---|---|---|---|---|---|
| PET content (mol %) | 100 | 100 | 100 | 100 | 100 |
| PET Chip IV (dl/g) | 0.90 | 0.95 | 1.05 | 1.15 | 1.25 |
| CEG of PET chip (meq/kg) | 25 | 23 | 18 | 16 | 14 |
| Spinning temperature (° C.) | 283 | 290 | 293 | 295 | 295 |
| Total drawing ratio | 6.1 | 6.0 | 5.9 | 5.8 | 5.7 |
| Relaxing ratio | 6 | 5 | 4 | 3.5 | 3 |
| Heat-treating temperature (° C.) | 215 | 218 | 220 | 222 | 225 |

The properties of the polyester fibers prepared according to Examples 1 to 5 were measured according to the following methods, and the measured properties are listed in the following Table 2.

1) Crystallinity

The density ρ of the polyester fiber was measured by a density gradient method using n-heptane and carbon tetrachloride at 25° C. and the crystallinity was calculated according to the following Calculation Formula 1:

$$X_c (\text{Crystallinity}) = \frac{\rho_c(\rho - \rho_a)}{\rho(\rho_c - \rho_a)}$$ [Calculation Formula 1]

wherein, $\rho$ is the density of the fiber, $\rho_c$ is the density of the crystal region ($\rho_c$=1.457 g/cm$^3$ in the case of PET), and $\rho_a$ is the density of the amorphous region ($\rho_a$=1.336 g/cm$^3$ in the case of PET).

2) Intrinsic Viscosity (IV)

After extracting the spinning oil from the fiber sample with carbon tetrachloride and dissolving the fiber sample in ortho-chlorophenol (OCP) at 160±2° C., the viscosity of the fiber sample in a capillary was measured by using an automatic viscometer (Skyvis-4000) at the temperature of 25° C., and the intrinsic viscosity (IV) of the fiber was calculated according to the following Calculation Formula 2:

Intrinsic Viscosity (IV)={(0.0242×Rel)+0.2634}×F

Rel=(seconds of solution×specific gravity of solution×viscosity coefficient)/(OCP viscosity)

F=(IV of the standard chip)/(average of three IV measured from the standard chip with standard action) [Calculation Formula 2]

3) CEG Content

The CEG content of the polyester fiber was measured according to ASTM D 664 and D 4094 methods. The fiber sample of 0.2 g was introduced in 50 mL Erlenmeyer flask, and benzyl alcohol of 20 mL was introduced therein and the flask was heated to 180° C. by using a hot plate and the temperature was maintained for 5 minutes so as to dissolve the sample completely. And then, the solution was cooled to 160° C. and 5-6 drops of phenol phthalene were added therein when the temperature reached 135° C., and the CEG content (COOH million equiv./kg of sample) was calculated from the calculation formula 3 at the titration point where the colorless solution becomes pink by titrating the solution with 0.02 N KOH.

$$CEG=(A-B)\times 20\times 1/W \qquad \text{[Calculation Formula 3]}$$

wherein, A is the amount (mL) of KOH that is spent in the titration for the fiber sample, B is the amount (mL) of KOH that is spent in the titration for the vacant sample, and W is the weight (kg) of the fiber sample.

4) Initial Modulus

The initial modulus was obtained by calculating a modulus value of elasticity from a gradient in an elastic range of a tenacity-elongation graph which is obtained by a tensile test, according to ASTM D 885 method.

5) Tensile Tenacity and Elongation at Break

The tensile tenacity and elongation at break were measured by using a universal testing machine (Instron Co.), and the length of the fiber sample was 250 mm, the tensile speed was 300 mm/min, and the initial load was 0.05 g/d.

6) Dry Heat Shrinkage Rate

The dry heat shrinkage rate was measured for 2 minutes at the temperature of 180° C. with the initial tension of 30 g by using a Testrite MK-V device (Testrite Co., England).

7) Toughness

The toughness ($10^{-1}$ g/d) was calculated by the following Calculation Formula 4:

$$\text{Toughness} = \text{Strenegth (g/d)} \times \sqrt{\text{ElongationatBreak}(\%)} \qquad \text{[Calculation Formula 4]}$$

8) The Fineness of Monofilament

The fineness of monofilament was measured according to the method of picking the fiber of 9000 m by using a reel, weighing the fiber to obtain the total fineness (denier) of the fiber, and dividing the total fineness by the number of the filaments.

9) Elongation

After a tenacity-elongation curve was obtained by the method as same as the tensile tenacity and elongation at break, the elongation value corresponding to each load was identified in the tenacity-elongation curve.

TABLE 2

|  | Example 1 | Example 2 | Example 3 | Example 4 | Example 5 |
|---|---|---|---|---|---|
| Crystallinity (%) | 44.2 | 44.5 | 44.7 | 44.8 | 44.9 |
| IV of the fiber (dl/g) | 0.85 | 0.88 | 0.92 | 0.97 | 1.01 |
| CEG of the fiber (meq/kg) | 29 | 27 | 25 | 24 | 22 |
| Initial modulus (g/d) | 127 | 120 | 118 | 113 | 107 |

TABLE 2-continued

|  | Example 1 | Example 2 | Example 3 | Example 4 | Example 5 |
|---|---|---|---|---|---|
| Tensile tenacity (g/d) | 8.2 | 8.5 | 8.8 | 9.1 | 9.2 |
| Elongation at break (%) | 14 | 14.3 | 14.5 | 15 | 16 |
| Dry heat shrinkage (%) | 5.0 | 5.2 | 5.5 | 6.0 | 6.2 |
| Toughness ($\times 10^{-1}$ g/d) | 30.7 | 30.1 | 33.5 | 35.2 | 36.8 |
| Fineness of monofilament (de) | 7.7 | 7.7 | 8.3 | 4.2 | 4.7 |
| Total fineness (de) | 460 | 460 | 500 | 500 | 460 |
| Number of filaments | 60 | 60 | 60 | 120 | 120 |
| Elongation (%) at the stress of 1.0 g/d | 0.30 | 0.33 | 0.35 | 0.37 | 0.39 |
| at the stress of 4.0 g/d | 2.5 | 2.8 | 3.0 | 3.2 | 3.8 |
| at the stress of 7.0 g/d | 5.5 | 5.8 | 6.2 | 6.5 | 6.8 |

Comparative Examples 1 to 5

The polyester fibers of Comparative Examples 1 to 5 were prepared substantially according to the same method as in Examples 1 to 5, except the conditions disclosed in the following Table 3.

TABLE 3

|  | Comparative Example 1 | Comparative Example 2 | Comparative Example 3 | Comparative Example 4 | Comparative Example 5 |
|---|---|---|---|---|---|
| PET content (mol %) | 100 | 100 | 100 | 100 | 100 |
| PET Chip IV (dl/g) | 7.5 | 9.5 | 1.0 | 1.3 | 1.4 |
| CEG of PET chip (meq/kg) | 30 | 23 | 20 | 17 | 15 |
| Spinning temperature (° C.) | 305 | 305 | 307 | 307 | 310 |
| Total drawing ratio | 6.7 | 6.7 | 6.6 | 4.8 | 4.5 |
| Relaxing ratio | 7.3 | 7.8 | 8.5 | 9.7 | 10.5 |
| Heat-treating temperature (° C.) | 240 | 240 | 245 | 245 | 242 |

The properties of the polyester fibers prepared according to Comparative Examples 1 to 5 were measured substantially according to the same method as in Examples 1 to 5, and the measured properties are listed in the following Table 4.

TABLE 4

|  | Comparative Example 1 | Comparative Example 2 | Comparative Example 3 | Comparative Example 4 | Comparative Example 5 |
|---|---|---|---|---|---|
| Crystallinity (%) | 52.2 | 51.3 | 50.8 | 50.5 | 50.2 |
| IV of the fiber (dl/g) | 0.60 | 0.62 | 0.70 | 0.80 | 0.85 |
| CEG of the fiber (meq/kg) | 62 | 58 | 48 | 45 | 43 |
| Initial modulus (g/d) | 78 | 75 | 65 | 63 | 60 |
| Tensile tenacity (g/d) | 6.5 | 7.3 | 8.0 | 8.2 | 8.1 |
| Elongation at break (%) | 11 | 12 | 12.5 | 13.0 | 13.2 |
| Dry heat shrinkage (%) | 2.5 | 3.2 | 4.2 | 4.5 | 4.8 |
| Toughness ($\times 10^{-1}$ g/d) | 21.6 | 25.3 | 28.3 | 29.6 | 29.4 |
| Fineness of monofilament (de) | 1.25 | 6.0 | 6.0 | 3.0 | 3.3 |
| Total fineness (de) | 200 | 240 | 600 | 700 | 800 |
| Number of filaments | 160 | 40 | 50 | 230 | 240 |
| Elongation (%) at the stress of 1.0 g/d | 1.03 | 1.05 | 1.1 | 1.13 | 1.2 |
| at the stress of 4.5 g/d | 10.5 | 11.0 | 11.5 | 12.5 | 13.5 |
| at the stress of 7.0 g/d | 14.5 | 15.8 | 16.9 | 17.6 | 18.8 |

Preparation Examples 1 to 5

Raw fabrics for airbag were woven from the polyester fibers prepared according to Examples 1 to 5 by using a Rapier Loom, and were prepared into the fabrics for airbag through the scouring and tentering processes. Then, polyvinylchloride (PVC) resin was coated on the fabrics with a knife over roll coating method to obtain PVC coated fabrics.

At this time, the weaving density of warps and wefts, the weaving type, and the amount of coating resin of the fabrics were as disclosed in the following Table 5, and the other conditions for Preparation Examples 1 to 5 followed conventional conditions for preparing a polyester fabric for airbag.

TABLE 5

|  |  | Preparation Example 1 | Preparation Example 2 | Preparation Example 3 | Preparation Example 4 | Preparation Example 5 |
|---|---|---|---|---|---|---|
| Weaving density | Warp | 53 | 53 | 53 | 49 | 49 |
| (warp × weft) | Weft | 53 | 53 | 53 | 49 | 49 |
| Weaving type |  | Plain | Plain | Plain | Plain | Plain |
| Amount of coating resin (g/m$^2$) |  | 25 | 25 | 25 | 30 | 30 |

The properties of the polyester fabrics for airbag prepared by using the polyester fibers of Examples 1 to 5 were measured by the following methods, and the measured properties are listed in the following Table 6.

(a) Tensile Tenacity and Elongation at Break

The fabric sample was cut from the fabric for airbag and fixed at the lower clamp of the apparatus for measuring the tensile tenacity according to ASTM D 5034. Thereafter, while moving the upper clamp that holds the upper part of the fabric sample upwardly, the tenacity and the elongation at the time when the fabric sample was broken were measured.

(b) Tearing Strength

The tearing strength of the fabric for airbag was measured according to ASTM D 2261.

(c) Shrinkage Rate

The shrinkage rates in the directions of warp and weft were measured according to ASTM D 1776. First, the sample was cut from the fabric for airbag, and the sample was marked to indicate 20 cm that is the length before shrinkage in each direction of warp and weft. Then, after the sample was heat-treated at 149° C. for 1 hour, the length of the sample after shrinkage was measured. The shrinkage rates (%) in the directions of warp and weft were calculated by the equation of {[(length before shrinkage−length after shrinkage)/(length before shrinkage)]×100}.

(d) Stiffness

The stiffness of the fabric was measured with a Circular Bend method by using the apparatus for testing the stiffness according to ASTM D 4032. Furthermore, it is also possible to use a cantilever method for measuring the stiffness of the fabric, which is performed by measuring the bending length of the fabric with a cantilever measuring device having a slope of a certain angle for bending the fabric.

(e) Thickness

The thickness of the fabric for airbag was measured according to ASTM D 1777.

(f) Air Permeability

According to ASTM D 737, after storing the fabric for airbag at the condition of 20° C. and 65% RH for 1 day or more, the pressured air of 125 Pa was applied to a circular cross-section of 38 cm$^2$ and the amount of air passed through the cross-section was measured.

TABLE 6

|  | Preparation Example 1 | Preparation Example 2 | Preparation Example 3 | Preparation Example 4 | Preparation Example 5 |
|---|---|---|---|---|---|
| Tensile tenacity (kgf/inch) | 235 | 240 | 242 | 244 | 249 |
| Elongation at break (%) | 35 | 37 | 39 | 39 | 40 |
| Tearing strength (kgf) | 23 | 25 | 30 | 32 | 40 |
| Shrinkage rate Warp of fabric (%) | 0.8 | 0.7 | 0.7 | 0.6 | 0.6 |
| Weft | 0.7 | 0.6 | 0.5 | 0.6 | 0.5 |
| Stiffness (kgf) | 0.75 | 0.74 | 0.71 | 0.67 | 0.52 |
| Air permeability (cfm) | 1.0 | 1.0 | 1.0 | 0.9 | 0.9 |

Comparative Preparation Examples 1 to 5

The polyester fabrics of Comparative Preparation Examples 1 to 5 were prepared and their properties were measured substantially according to the same method as in Preparation Examples 1 to 5, except the polyester fibers of Comparative Examples 1 to 5 were used. The results of the measured properties are listed in the following Table 7.

TABLE 7

|  | Comparative Preparation Example 1 | Comparative Preparation Example 2 | Comparative Preparation Example 3 | Comparative Preparation Example 4 | Comparative Preparation Example 5 |
|---|---|---|---|---|---|
| Tensile tenacity (kgf/inch) | 220 | 223 | 224 | 226 | 228 |
| Elongation at break (%) | 23 | 24 | 24 | 27 | 27 |
| Tearing strength (kgf) | 10 | 12 | 14 | 14 | 16 |
| Shrinkage rate Warp of fabric (%) | 0.4 | 0.4 | 0.5 | 0.5 | 0.6 |
| Weft | 0.3 | 0.4 | 0.4 | 0.5 | 0.6 |
| Stiffness (kgf) | 1.2 | 1.2 | 1.1 | 1.1 | 1.1 |
| Air permeability (cfm) | 1.7 | 1.9 | 1.9 | 2.0 | 2.1 |

As shown in Table 6, it can be recognized that the fabrics for airbag of Preparation Examples 1 to 5 that were prepared from the polyester fibers of Examples 1 to 5 having the optimized elongation and initial modulus show superior properties. Particularly, the fabrics for airbag of Preparation Examples 1 to 5 have 235 to 249 kgf/inch of the tensile tenacity, 23 to 40 kgf of the tearing strength, and 0.6% to 0.8% and 0.5% to 0.7% of the shrinkage rates in the directions of warp and weft, respectively. At the same time, it is also recognized that the polyester fabrics for airbag of Preparation Examples 1 to 5 have superior folding property and packing property, in addition to their superior shape stability and mechanical property, due to their optimal range of the stiffness, i.e., 0.54 to 0.79 kgf.

Furthermore, it is also recognized that the fabrics for airbag of Preparation Examples 1-5 can show superior air-tightness in the range that the air permeability of the coated fabric is 1.0 cfm or less since the fabrics were prepared by using the high strength, high elongation, and high shrinkage fibers.

On the contrary, as shown in Table 7, it is recognized that the fabrics for airbag of Comparative Preparation Examples 1 to 5 that were prepared by using the polyester fibers of Comparative Examples 1 to 5 do not satisfy such characteristics. Particularly, the fabrics for airbag of Comparative Preparation Examples 1 to 5 have the shrinkage rates similar to the fabrics of the Preparation Examples, but the tensile tenacity and tearing strength of the fabrics are deteriorates remarkably. For the fabrics for airbag of Comparative Preparation Examples 1 to 5, the tensile tenacity is 220 to 228 kgf/inch and the tearing strength is 10 to 16 kgf. As such, when the fabrics inferior in the tensile tenacity and the tearing strength are applied to an airbag device, there may be occurred a problem that the airbag bursts during expanding the airbag due to the deterioration of mechanical properties.

Furthermore, it is recognized that the air permeability of the coated fabric of Comparative Preparation Examples 1 to 5 is largely increased to the range of 1.7 to 2.1 cfm and the air-tightness is bad. When the air permeability is increased, there may be also a problem that the air of the airbag leaks easily during expanding the airbag and the airbag does not act properly to protect a driver and passengers.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An airbag comprising an airbag fabric, said airbag fabric comprising a polyester fiber,
   wherein said polyester fiber has an elongation of 0.4% or less at a stress of 1.0 g/d, an elongation of 4.0% or less at a stress of 4.0 g/d, and an elongation of 7.0% or less at a stress of 7.0 g/d, an initial modulus of 105 to 130 g/d at room temperature, a tensile tenacity of 8.2 g/d or more, an elongation at break of 14% or more, a dry heat shrinkage of 5.0% to 6.2%,
   wherein said polyester fiber is comprised of 60-200 polyester monofilaments, the polyester fiber includes poly(ethylene terephthalate) in the content of 70 mol % or more, a fineness of each of the monofilaments is 4.2 to 7.7 denier, and a total fineness of the polyester fiber is 460 to 600 denier; and
   wherein said polyester fiber is produced by a process comprising the steps of:
   melt-spinning a polyester polymer having an intrinsic viscosity of 0.85 dl/g or more at 283 to 295° C. to prepare a polyester undrawn fiber;
   drawing the polyester undrawn fiber with a total drawing ratio of 5.7 to 6.1; and
   heat-setting the drawn fiber at a temperature of 215 to 225° C.

2. The airbag according to claim 1, wherein an intrinsic viscosity of the polyester fiber is 0.8 dl/g or more.

3. The airbag according to claim 1, wherein a content of carboxylic end group of the polyester fiber is 50 meq/kg or less.

4. The airbag according to claim 1, wherein a crystallinity of the polyester fiber is 40% to 55%.

5. The airbag according to claim 1, wherein a toughness of the polyester fiber is $25 \times 10^{-1}$ g/d or more.

6. The airbag according to claim 1, wherein the total fineness is 460 to 530 denier.

7. The airbag fiber according to claim 1, wherein the total fineness of the polyester fiber is 460 to 530 denier.

8. An airbag fabric comprising a polyester fiber, said polyester fiber having an elongation of 0.4% or less at a stress of 1.0 g/d, an elongation of 4.0% or less at a stress of 4.0 g/d, and an elongation of 7.0% or less at a stress of 7.0 g/d, an initial modulus of 105 to 130 g/d at room temperature, a tensile tenacity of 8.2 g/d or more, an elongation at break of 14% or more, a dry heat shrinkage of 5.0% to 6.2%,
   wherein said polyester fiber is comprised of 60-200 polyester monofilaments, the polyester fiber includes poly(ethylene terephthalate) in the content of 70 mol % or more, a fineness of each of the monofilaments is 4.2 to 7.7 denier, and a total fineness of the polyester fiber is 460 to 600 denier; and
   wherein said polyester fiber is produced by a process comprising the steps of:
   melt-spinning a polyester polymer having an intrinsic viscosity of 0.85 dl/g or more at 283 to 295° C. to prepare a polyester undrawn fiber;
   drawing the polyester undrawn fiber with a total drawing ratio of 5.7 to 6.1; and
   heat-setting the drawn fiber at a temperature of 215 to 225° C.

9. The airbag fabric according to claim 8, which has a tensile tenacity of 220 kgf/inch or more, said tensile tenacity being measured according to ASTM D 5034 method.

10. The airbag fabric according to claim 8, which has a tearing strength of 22 kgf or more, said tearing strength being measured according to ASTM D 2261 method.

11. The airbag fabric according to claim 8, which has a shrinkage rate in the warp direction of 4.0% or less and a shrinkage rate in the weft direction of 4.0% or less, said shrinkage rate being measured according to ASTM D 1776 method.

12. The airbag fabric according to claim 8, which has a stiffness of 0.2 kgf or more, said stiffness being measured according to ASTM D 4032 method.

13. The airbag fabric according to claim 8, which has an air permeability of 10.1 cfm or less, said air permeability being measured according to ASTM D 737 method.

14. A method of preparing the polyester fiber according to claim 1, including the steps of:
   melt-spinning a polyester polymer having an intrinsic viscosity of 0.85 dl/g or more at 283 to 295° C. to prepare a polyester undrawn fiber; and
   drawing the polyester undrawn fiber to obtain the polyester fiber at a total drawing ratio of 5.7 to 6.1; and
   heat-setting the drawn fiber at a temperature of 215 to 225° C.,
   wherein the polyester fiber has an elongation of 0.4% or less at a stress of 1.0 g/d, an elongation of 4.0% or less at a stress of 4.0 g/d, and an elongation of 7.0% or less at a stress of 7.0 g/d, an initial modulus of 105 to 130 g/d at room temperature, a tensile tenacity of 8.2 g/d or more, an elongation at break of 14% or more, and a dry heat shrinkage of 5.0% to 6.2%;
   wherein the polyester fiber is comprised of 60-200 polyester monofilaments;
   wherein the polyester fiber includes poly(ethylene terephthalate) in a content of 70 mol % or more; and
   wherein a total fineness of the polyester fiber is 250 to 600 denier.

15. The method according to claim 14, wherein a difference in the intrinsic viscosity between the polyester polymer and the polyester fiber is 0.5 dl/g or less.

16. The method according to claim 14, wherein a content of carboxylic end group (CEG) of the polyester polymer is 30 meq/kg or less.

17. The method according to claim 14, wherein a difference between the CEG content of the polyester polymer and the CEG content of the polyester fiber is 20 meq/kg or less.

18. The method according to claim 14, wherein the melt-spinning process is carried out with a spinning speed of 300 m/min to 1,000 m/min.

19. The method according to claim 14, wherein the drawing process is carried out after passing the undrawn fiber through godet rollers with a condition of an oil pick-up unit of 0.2% to 2.0%.

20. The method according to claim 14, further including a relaxing process after drawing the undrawn fiber, wherein a relaxing ratio is 1% to 7%.

21. The method according to claim 14, further including a winding process after drawing the undrawn fiber, wherein a winding speed is 2,000 to 4,000 m/min.

* * * * *